Feb. 6, 1962 J. HUMMEL 3,019,544
FISHING LURES
Filed July 3, 1959

INVENTOR
JOHN HUMMEL
BY Smart & Biggar
ATTORNEYS.

United States Patent Office 3,019,544
Patented Feb. 6, 1962

3,019,544
FISHING LURES
John Hummel, 1000 Riverside Drive, Ottawa,
Ontario, Canada
Filed July 3, 1959, Ser. No. 824,889
1 Claim. (Cl. 43—42.41)

This invention relates to fishing lures and has for its primary object to provide an improved fishing lure in which the hook is normally shielded from weeds and the like and is only exposed when the lure is bitten by a fish.

It is most disconcerting to an angler when the hook of his lure becomes entangled in weeds or the like, such an occurrence sometimes necessitating cutting of the fishing line and abandonment of the lure and the length of line below water. It is also disconcerting to an angler, having landed a fish, to encounter undue delay in freeing the hook from the mouth of the fish before he can again start fishing. This delay can allow a passing school of fish to get out of range before the angler makes his next cast.

The present invention obviates or mitigates such a possibility by providing a fishing lure comprising a spoon, a hook having a shank, and spring means interconnecting said shank and spoon and normally urging same apart, said spoon having a recess or aperture adapted to receive the point of said hook and said spring means being adapted normally to restrain said hook point against movement out of said recess or aperture.

The spring means is a leaf spring which is releasably locked to the spoon to provide for ready release of the hook and spring when a fish has been landed, whereby a duplicate hook and spring may be locked to the spoon to render the lure ready for immediate re-use.

An embodiment of the invention will now be described by way of example with reference to the accompanying drawings in which.

Figure 5:
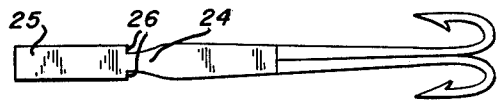
FIGURE 5 is a detail of the removable hook and spring.

In the embodiment illustrated the lure is provided with a removable hook and spring. The lure comprises a spoon 18 having apertures 19 in a ridge portion thereof, a hook 20, which is illustrated as a double hook in this embodiment, hook shank 21 and leaf spring 22. Engagement of the hook 20 in the apertures 19 guards the hook against entanglement in weeds or the like. The hook is normally urged into apertures 19 under the action of spring 22 and is only exposed when the spoon 18 and shank 21 are urged towards each other against the action of spring 22, as when the lure is bitten by a fish. It will be manifest that when the spoon and shank are urged toward each other by the bite of a fish the hook will become exposed inside the mouth of the fish and the fish will be hooked in normal manner. The leaf spring 22 has a special configuration and a cooperating bracket 23 is provided on the spoon 18 for releasably locking the spring to the spoon. As clearly shown in FIGURE 5, the leaf spring 22 is formed with a waist 24. Rearwardly of the waist a portion 25 of uniform width and depth terminates at the waist portion in a pair of forwardly facing shoulders 26. Forwardly of the waist the leaf spring tapers in both width and depth to give increased resiliency and the hook shank 21 is secured to this forward portion as by welding or the like.

The spring locking bracket 23 is in the form of a non-resilient metallic strip secured along a first portion 27 of its length to the underside of the rear end of spoon 18 and bent upwards, forwards and downwards to form an upstanding intermediate or second portion 28, a third portion 29 extending substantially at right angles to said second portion, and a fourth portion 30 extending downwards at a small inclination to said third portion. The bracket is slotted as at 31, 32 and 33, the slots being just wide enough to pass the leaf spring 22. Slot 32 narrows abruptly at its upper end to form a recess 34 just wide enough to accommodate waist 24 of the leaf spring 22.

Figure 1:
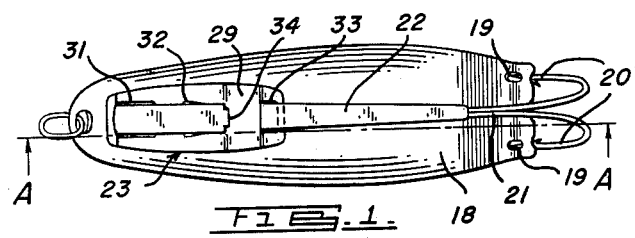
FIGURE 1 is an observe plan view of a lure according to the invention in which the hook and spring are releasable from the lure.
Figure 2:
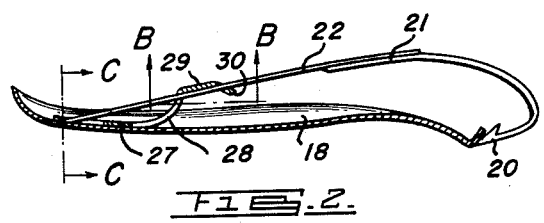
FIGURE 2 is a sectional side view on the line A—A of FIGURE 1.
Figure 4:
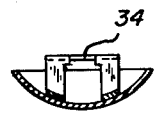
FIGURES 3 and 4 are sectional views taken on the lines B—B and C—C, respectively, of FIGURE 2.
Figure 3:
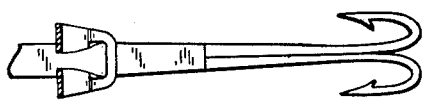

In the locked position of the spring as shown in FIGURE 2 the waist 24 is engaged in recess 34 and the shoulders 26 engage the rear face of bracket portion 28 at the sides of recess 34 thus preventing detachment of the spring from the spoon by forward pulling of the hook 20. The waist 24 is normally held in recess 34 by the engagement of the leaf spring with the forward edge of slot 33 and the face of the spoon 18 at the rear of slot 31. The rear end of slot 31 acts as a stop for the rear end of the spring 22 and cooperates with the sides of recess 34 engaging shoulders 26 in presenting undesirable longitudinal movement of the spring relative to the spoon 18. The slots 31, 32 and 33 moreover provide guidance for the leaf spring 22 to ensure that the points of hook 20 are in alignment with apertures 19 adapted to accommodate same.

To facilitate ready re-use of the lure the hook and spring may be quickly removed from the lure and left in the mouth of a fish which has just been caught, whereupon a replacement hook and spring may be attached to the lure for immediate re-use thereof. The hook and spring are removed from the lure simply by pressing down and forwardly on portion 25 of the spring 22 whereby the waist portion 24 is disengaged from the recess 34 and the spring and hook may be removed by pulling same forwardly. To insert a new hook and spring the portion 25 of the spring is simply inserted through slots 33 and 32 into engagement with the surface of the spoon within slot 31, care being taken to ensure that the forward end of spring 22 is urged toward the spoon so that the points of hook 20 are on the opposite side of the spoon to bracket 23. As the leaf spring is inserted it is placed in tension by engagement of the underside of the spring by the upper surface of bracket 23 between the slots 31 and 32 and by the forward edge of slot 33 and engagement of the upper surface of portion 25 by the upper end of slot 32. This tension is only relieved when the rear end of the spring 22 engages the rear end of slot 31, at which time the portion 25 has passed completely through slot 32 and the waist 24 is in register with recess 34 and is urged into the latter by the resiliency of the spring 22.

It will be manifest that other embodiments may be envisaged without departing from the scope of the present invention. For example a similar arrangement to that shown may be provided by pressing parts out of the body of spoon 18 instead of providing a separate bracket. Moreover, instead of providing apertures in the spoons to receive the points of the hooks, the spoons may simply be recessed at the appropriate locations.

What I claim as my invention is:

A fishing lure comprising a spoon, a hook having a shank, and spring means interconnecting said shank and spoon and normally urging same apart, said spoon having guard means adapted to receive the point of said hook and shield same from entanglement with weeds, said spring means being adapted normally to restrain said hook point against movement out of said guard means, said spring means being a leaf spring to one end of which said hook shank is rigidly secured, and locking means being provided for releasably locking said leaf spring at its other end to said spoon, said leaf spring having a waist portion and said locking means comprising a bracket secured to the spoon and having a recess adapted to accommodate said waist portion and restrain the leaf spring against longitudinal movement in one direction, said bracket being slotted to accommodate said other end of said leaf spring and to present an abutment adapted to engage the extremity of said leaf spring and restrain the leaf spring against longitudinal movement in the other direction, the resiliency of said leaf spring normally holding it in locked engagement with said bracket.

References Cited in the file of this patent

UNITED STATES PATENTS

| | | |
|---|---|---|
| 2,163,378 | Horvath | June 20, 1939 |
| 2,860,441 | Castner | Nov. 18, 1958 |